(12) United States Patent
Sala et al.

(10) Patent No.: US 6,756,889 B2
(45) Date of Patent: Jun. 29, 2004

(54) DUAL SENSOR CRASH SENSING SYSTEM

(75) Inventors: Dorel M. Sala, Troy, MI (US); Jenne-Tai Wang, Troy, MI (US); Mark O. Neal, Rochester, MI (US); Chin-Hsu Lin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 104 days.

(21) Appl. No.: 10/242,180

(22) Filed: Sep. 12, 2002

(65) Prior Publication Data

US 2004/0051632 A1 Mar. 18, 2004

(51) Int. Cl.$^7$ ................................................ B60Q 1/00
(52) U.S. Cl. ...................... 340/436; 180/282; 701/45
(58) Field of Search .............................. 340/436, 438; 180/282; 701/45

(56) References Cited

U.S. PATENT DOCUMENTS

| | | | |
|---|---|---|---|
| 5,746,444 A | * | 5/1998 | Foo et al. ................... 280/735 |
| 6,167,335 A | * | 12/2000 | Ide et al. ..................... 701/45 |
| 6,186,539 B1 | * | 2/2001 | Foo et al. ................... 280/735 |
| 6,424,898 B2 | * | 7/2002 | Anishetty et al. ............ 701/45 |
| 6,512,969 B1 | * | 1/2003 | Wang .......................... 701/45 |
| 6,549,836 B1 | * | 4/2003 | Yeh et al. .................... 701/45 |
| 6,662,092 B2 | * | 12/2003 | Wang et al. ................. 701/45 |

* cited by examiner

Primary Examiner—Daniel J Wu
Assistant Examiner—Sihong Huang
(74) Attorney, Agent, or Firm—Kathryn A. Marra (57) ABSTRACT

A computer based method for activating a vehicular safety device for passenger protection is disclosed. The method uses a centrally located front-end acceleration sensor and a passenger compartment sensor. When a crash situation is sensed, current acceleration data is integrated to produce velocity values for both sensor locations. Actual displacement values for the front-end sensor are calculated as well as displacement values based on absolute values of acceleration of that sensor. The velocity and displacement values are selectively used in at least three vehicle crash mode analyses. Examples of such crash modes are full frontal-like modes, pole-like modes and angle-like modes. When appropriate threshold values are exceeded, device activation for one or more activation stages is initiated.

20 Claims, 8 Drawing Sheets

DUAL SENSOR CRASH SENSING SYSTEM

TECHNICAL FIELD

This invention pertains to computer based methods for determining whether certain frontal or angular crash situations in a vehicle require activation of a safety device. More specifically, this invention pertains to the use of two acceleration sensors, one in the passenger compartment and one centrally located at the front of the vehicle in such a method. The method involves the continuous selective use of velocity and displacement values from the two sensors in at least three different modes of crash situations to determine whether a safety device, such as a passenger compartment air bag, is to be activated and, if so, how it is to be activated.

BACKGROUND OF THE INVENTION

Safety devices for the protection of the operator and passengers of automotive vehicles have been in use for many years. Many safety features function in a crash situation without external activation. Seat reinforcement, seat headrests, and passenger compartment padding are examples of such safety items. Other safety devices such as supplemental inflatable restraints, popularly known as air bags, require external activation when a crash event is apparently occurring.

Air bags comprise an inflatable bag, an electrically actuated igniter and a gas generator. Each bag is folded and stored with its igniter and gas generator in the steering wheel pad, instrument panel, door panel or body pillar. Air bags also require a collision detection system that determines when the bags should be deployed and signals the ignition of one or more charges (or stages) of the gas generator. Current air bag, and other passive passenger protection systems, rely on acceleration sensors (detecting abrupt vehicle deceleration) and a micro-processor based controller. An acceleration sensor is a device that continually senses accelerative forces and converts them to electrical signals. The controller continually receives acceleration signals from each sensor and processes them to determine whether a crash, situation is occurring that requires air bag deployment.

The content of such a crash detection system for safety device actuation usually depends upon the method or algorithm used by the controller for assessing crash severity. Most systems rely on an acceleration sensor placed in the passenger compartment, close to the center of gravity of the vehicle. This sensor is often put under the passenger seat as part of a sensing and diagnostic module (SDM) of the vehicle crash sensing system. In addition, some systems place one or more accelerometers at the center or sides of the radiator cross-tie-bar to detect vehicle front-end deceleration indicative of a crash. These front-end accelerometers have been called electrical frontal sensors, EFS. The crash detection controller receives signals from the acceleration sensor (s) and evaluates them in a preprogrammed manner to determine whether air bag deployment is necessary. The program may also determine the degree of deployment, e.g., one or two inflation stages, of the bag.

The algorithms of crash sensing controllers have involved increasing degrees of complexity. Acceleration values from a single sensor (e.g., the SDM sensor) have simply been compared with a pre-determined threshold acceleration value as a test for device deployment. Values from more than one sensor location have been used in the crash sensing practices. Acceleration values have been integrated over time to yield crush velocities, and further integrated to yield crush displacement values. Further, the derivative of acceleration values have been determined as "jerk" values Such velocity and displacement values, and jerk values, have also been compared with respective pre-determined threshold values as a more selective basis for achieving timely air bag. Also, acceleration data has been used in combination with seat occupancy information and seat belt usage.

There are variants in vehicle front-end crash modes and, of course, there can be considerable variation in the severity of a crash depending upon the structure and mass of a vehicle and its velocity at the onset of a crash. With respect to front-end crash modes, a vehicle may crash head-on with another vehicle (a full frontal crash mode) or with a narrower fixed object such as a pole. Front-end crashes of a vehicle with other vehicles often occur in an angular mode between head-on (zero degree) and a side-ways crash (ninety degrees). A further distinction is often made between an angular crash with a rigid or non-yielding object and an offset deformable barrier (OBD mode).

Actual vehicular crash testing reveals different patterns of front end and passenger compartment crush velocities and displacements associated with different crash modes. In fact, considerable crash testing of a vehicle has been required to provide the substantial database of threshold values of jerk, acceleration, velocity and/or displacement over a crash period for use by a crash-sensing controller. Such data must be compiled from suitably instrumented test vehicles over the relevant duration of each test crash period. Depending upon the nature and severity of a crash, an airbag deployment decision may be made by the controller process at any time during a period of from about 15 milliseconds (ms) to 70 ms or 100 ms or so from the onset of the crash.

It would be desirable to obtain a discriminative and robust crash sensing algorithm that could utilize suitable crash simulation models as a basis for establishing threshold values of, e.g., velocity and displacement at two or more acceleration sensor locations in a vehicle. Crash simulation models may be based, for example, on a suitable Finite Element Analysis (FEA). As stated, such threshold values must be obtained over a period of up to about 70 to 100 ms from the recognition of a crash event and stored in the memory of the controller. Accordingly, it is an object of this invention to provide a method of activating an air bag or other crash-responsive safety device that can utilize velocity and displacement values obtained from a suitable crash model. It is a further object of this invention to provide such a method that utilizes velocity and displacement values from two sensors, one located in the passenger compartment and one located centrally at the front of the vehicle. It is a still further object of this invention to provide an airbag activation method that utilizes a consideration of three or more distinct vehicle crash modes in use of time integrated acceleration sensor data.

SUMMARY OF THE INVENTION

This invention provides a vehicle crash sensing system which better discriminates severe crash events that require actuation of safety devices from minor crash incidents that do not require such actuation. This is accomplished by use of two acceleration sensors and an associated signal processing algorithm in a microprocessor. The crash sensing algorithm is composed of at least three parallel assessment branches or modules for detecting different crash modes, each of which uses only current velocity and displacement measures calculated by integrating the acceleration data recorded from the two vehicle mounted accelerometers.

In accordance with the invention a centrally located, front end acceleration sensor is employed together with a sensor in the passenger compartment. For example, the front end acceleration sensor, EFS, may be mounted at the center of the radiator cross-tie-bar in the engine compartment of the vehicle for sensing the acceleration of the tie-bar. The vehicle is also provided with an accelerometer in the passenger compartment, such as a location underneath the passenger seat as a part of a sensing and diagnostic module (SDM) of the vehicle crash sensing system. The vehicle crash sensing system detects and discriminates severe crash events from minor crash incidents by signals derived from the front end acceleration sensor and the SDM acceleration sensor. Such derived signals are used in the signal processing algorithm of this invention which is implemented in the control program within the microcomputer of the crash sensing system.

In a preferred embodiment of the invention, the control method uses sensor data in a manner to determine air bag inflation needs in each of a full frontal crash mode, a pole mode and an angular crash mode. Additional representative crash modes could be used but these three are sufficient and exemplified. When activated by predetermined threshold acceleration values from both sensors indicative of a possible crash, the subject method proceeds by continually integrating acceleration data from the two sensors to obtain corresponding velocity values for each sensor location over a period of up to 100 milliseconds or so. Further the acceleration data from the tie bar sensor is used to continually calculate two displacement values, one based on actual acceleration values and one based on corresponding absolute values of acceleration.

Thus, the acceleration data recorded at the central radiator tie bar (EFS) sensor (Ac) and the SDM sensor (As) are filtered and digitized. The respective signals are integrated over several milliseconds to calculate Vs, Vcm, Sc and Scad. Here Vs denotes the velocity at the SDM sensor; Vcm and Sc denote the maximum velocity and the actual displacement at the central front-end sensor location; and Scad denotes a displacement measure based on the absolute acceleration values at the central front-end sensor location, as explained in detail later. Following activation of the process, the acceleration and velocity values for the passenger compartment sensor are continually associated with times, to, and acceleration, velocity and displacement values for the front end sensor associated with times, tor, and stored in the memory of the vehicle's crash controller.

These velocity and displacement values are selectively used in a series of three parallel crash mode calculations and logical tests, namely a full frontal mode module, angle mode module, and a pole mode module. Preferably, each crash mode module has two sub-modules, i.e. the $1^{st}$ and $2^{nd}$ stage airbag deployment modules.

In accordance with the invention, the sensing algorithm uses the digitized acceleration signals, As and Ac, from both the SDM accelerometer and the EFS accelerometer to enable (or initiate) operation of the crash sensing method of this invention. The control method determines whether the acceleration, As, at the passenger compartment location is equal to or greater than a predetermined acceleration threshold which, for example, may be set at 2 g's (g being the acceration due to gravity). At the same time the acceleration, Ac, of the front-end sensor is compared with a larger threshold acceleration of, e.g., 8 to 12 g, suitable for the specific vehicle. If both As and Ac are not greater than the respective enable thresholds, the program loops back to monitoring the input. This controller cycle is repeated every millisecond or so.

At such time as a value of As is obtained that is greater than its enable threshold, the program initiates the system clock, to, and starts calculations of SDM velocity and displacement. If Ac does not then surpass its enable threshold within a predetermined time period, e.g., 10 to 20 ms, from the SDM enabling, the program is reset and loops back to monitoring inputs. But if a timely value of Ac is obtained that is greater than its enable threshold, the system clock, tor, is initiated and the calculation of the measures at the EFS is started. Conversely, if Ac exceeds its enable threshold first, the program initiates the system clock, tor, and starts the calculation of velocities and displacements at the front sensor. If, As does not surpass its enable threshold within a predetermined period, e.g., 10 to 20 ms, after the front sensor enabling, the program resets and loops back to monitoring the acceleration inputs. But if a timely value of As is obtained that is greater than its enable threshold, the system clock, to, is initiated and the calculation of the measures at the SDM location is started.

The sensing system is reset in the case of minor crash incidents by a reset module which determines whether the velocity measure, Vs, is equal to or greater than a predetermined threshold. If Vs is not equal to or greater than the reset threshold, the program loops back to monitoring the input. If Vs is greater than the threshold, the program advances to detailed crash analysis.

Once the crash severity determining method is enabled, the velocities and displacements are calculated and entered into the three branching program modules; the frontal crash mode module, the angle crash mode module and the pole crash mode module. The module for which the $1^{st}$ stage thresholds are first exceeded initiates the deployment of the airbag. Then its corresponding $2^{nd}$ stage sub-module determines the severity of the crash by comparing the measures with another set of thresholds. The other modes are ignored after a first stage deployment decision has been made.

In the frontal mode, first stage assessment, velocity values are used. It has been observed that the velocity measures, Vs and Vcm are generally very high for severe frontal full-barrier-like impact events. Accordingly, they are used in the method of this invention to determine whether or not to trigger the deployment of the first stage airbag inflator for this type of impact events. If, and only if, both velocity measures for an event are equal to or greater than a set of velocity thresholds, predetermined by experiment or calculation for the vehicle at the corresponding time (to or tor) in the crash sequence, the program will send a triggering signal out to ignite the first stage air bag inflation. In a typical vehicle, a full frontal mode situation will be detected and the air bag inflated within 10–25 ms of impact.

If first stage air bag inflation has been commanded through the frontal mode program module, the frontal mode, second stage determination is made. The velocity measure, Vcm, is used alone to determine whether or not to trigger the deployment of the second stage airbag inflator for this type of frontal full-barrier-like impact events.

In parallel with its analysis of the frontal mode-first stage the controller is also analyzing the angle crash mode, first stage and the pole crash mode, first stage. As stated, results from any crash mode analysis can trigger first stage air bag inflation.

The angle crash mode-first stage analysis is characterized by both relatively high speed and low speed impacts either of which may require airbag inflation. It has been found that a combination of the passenger compartment velocity measure, Vs, and the front end velocity, Vcm are generally high to very high for severe angle like events. For lower speed events, a combination of high values of front end velocity, Vcm, and a front end displacement, Scad, are considered. As stated, the Scad displacement value is based on the absolute value of Ac as will be shown in detail below. Accordingly, it is preferred to use these two combinations as alternatives in the angle mode to determine whether or not to trigger the deployment of the first stage airbag inflator for this type of impact events. In assessing the second stage of the angle mode, a suitably high front end displacement, Sc, is used as the basis for determining the triggering of the second stage airbag inflator.

In the pole mode-first stage a combination of velocity of the SDM sensor, Vs, and maximum velocity, Vcm, at the central front end sensor are used in assessing the severity of a pole crash mode type event. It will be recognized that these same values are used in the frontal mode first stage analysis. However, the time based threshold velocity values for this mode differ substantially from those for the frontal mode reflecting the differences in the crash characteristics of the two modes.

Values of Vcm are used in the second stage pole mode analysis.

A critical feature of a crash severity determination method is the availability of suitable threshold velocity and displacement values over a period of up to 100 ms for each acceleration sensor and device activation. These threshold values may be based on physical crash test data for the specific vehicle, or crash model data, or a combination of test data and modeling.

Other objects and advantages of the invention will become apparent from a detailed description of illustrated embodiments which follows.

BRIEF DESCRIPTION OF THE DRAWINGS

In the graphs of FIGS. 9A–9C, as well as the graphs of the following FIGS. 10A–10C, 11A–11C and 12A–12C, solid lines represent threshold data, dotted lines represent non-deploy events, dashed lines represent events requiring first stage only deployment and dot-dash lines represent events requiring both stages of deployment.

DESCRIPTION OF A PREFERRED EMBODIMENT

This illustrative embodiment of the crash detection algorithm of this invention uses two acceleration sensors. One sensor, the EFS sensor, is located at the center of the radiator tie bar at the front of the vehicle engine compartment. The radiator tie bar is close to the front of the vehicle and the sensor located there provides acceleration data reflecting crash experience at the front of the vehicle. A second accelerometer is located under a front passenger seat in the passenger compartment of the vehicle. This location is a standard location for an accelerometer that transmits data to the airbag inflation controller. This acceleration sensor location is sometimes also used for other vehicle or chassis control and/or diagnostic purposes, as in the sensing and diagnostic module (SDM). The acceleration sensors are electrically powered and continually supply their signals to the crash detection controller during vehicle operation. The controller includes a microprocessor that continually receives and analyzes acceleration data from the two sensors to determine whether a crash situation exists requiring deployment of an airbag. This invention provides a reliable and discerning process for such a determination.

In this embodiment of the invention, three front-end crash modes of the vehicle are utilized. One crash mode is a full frontal mode representing a head-on collision of the vehicle with another vehicle or a fixed object such as a concrete wall. The second crash mode is an angular mode in which the object that is struck is fairly rigid but is struck at an offset angle between a head-on collision and a side impact. The third mode includes collisions with a pole-like object at the front of the vehicle. This kind of collision has different crash characteristics from a full frontal crash mode as reflected in the time-based values of Vs, Vcm and Sc.

Figure 1:
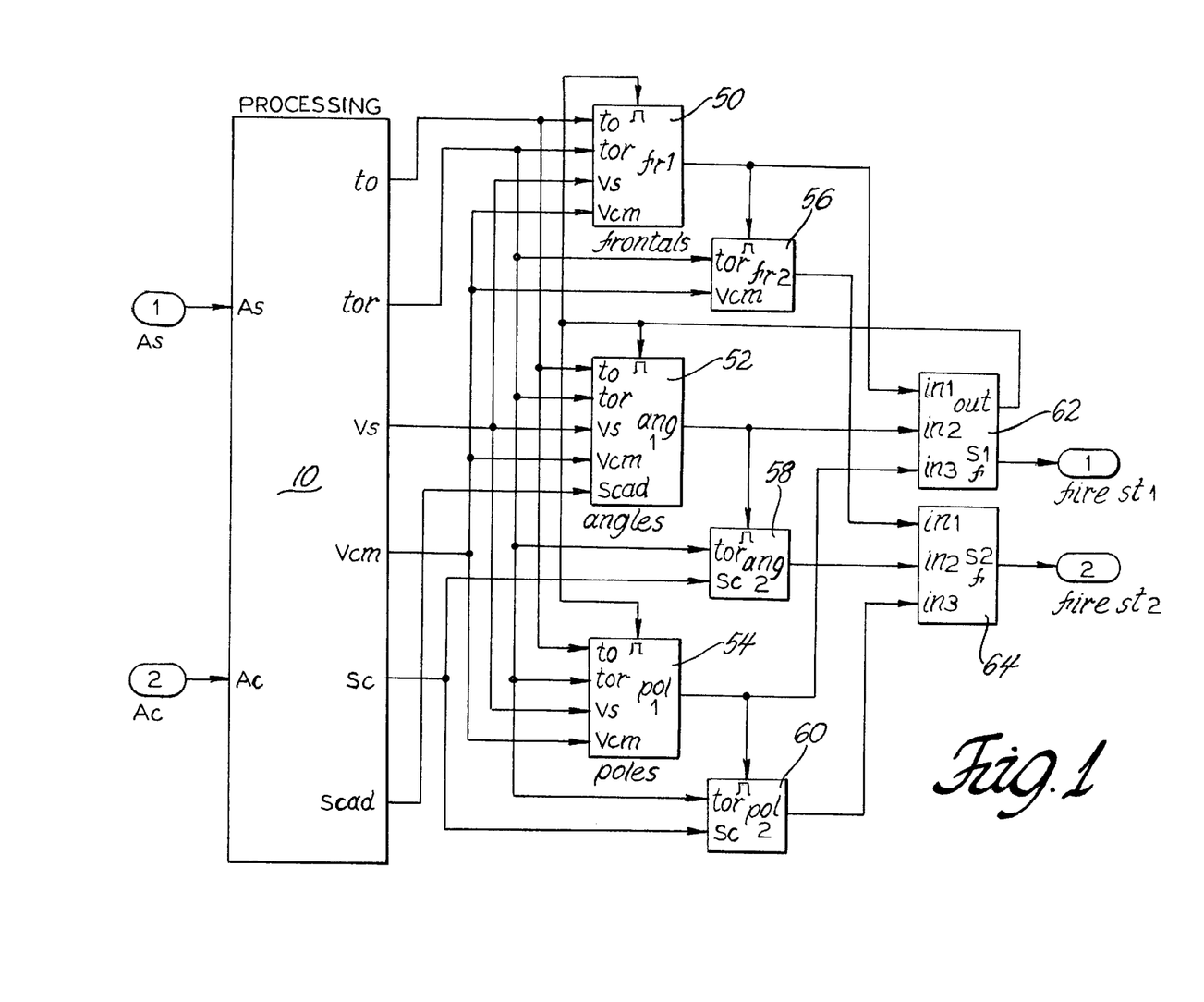
FIG. 1 is a process flow diagram for an air bag activation controller receiving continuous acceleration signals and, following the enabling process of FIG. 2, calculating current values of velocity and displacement for the acceleration sensor sites. The velocity and displacement values are selectively applied in three parallel crash mode modules; a frontal mode, an angular mode and a pole mode; and the results, which may include two stages of deployment, are used in determining whether air bag activation is required.

FIG. 1 is a process flow diagram of a preferred three crash mode algorithm executed by a crash detection microprocessor in accordance with this invention. However, since vehicles normally operate without crashing, accelerometer data is continually being generated without a need for execution of the three crash mode analysis. Accordingly, the subprocess of FIG. 2, an enabling process for crash severity detection, is first employed. Thus, the processing box 10 in FIG. 1 continually receives acceleration data from the respective sensors as As, from the under seat SDM sensor, and Ac from the EFS sensor at the center of the radiator tie bar. The continuous signals are filtered and analog-digital converted in a known manner to provide discrete signals at one millisecond processing intervals. The function of processing block 10 is summarized in FIG. 2.

Figure 2:
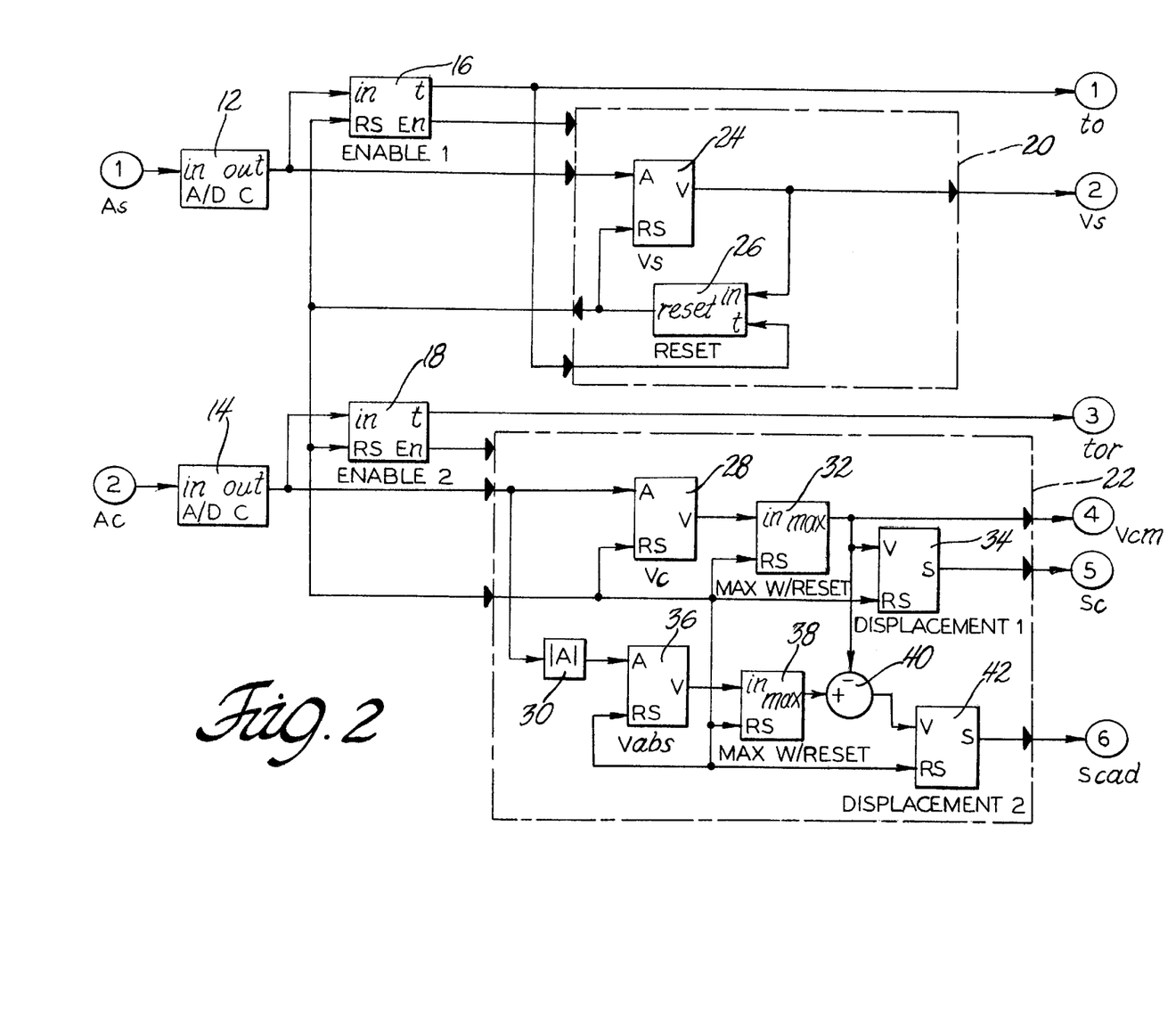
FIG. 2 is a process flow diagram for an air bag activation controller process for assessing acceleration data and determining whether the process of FIG. 1 is to be initiated. Upon such initiation, the process then calculates velocity and displacement values for the FIG. 1 process.

Referring to FIG. 2, the respective acceleration values enter (in) boxes 12 and 14. Signal As is filtered and digitized in box 12. Ac is filtered and digitized in box 14. These signals are sampled every millisecond. The As signal (originating from the under seat location) then enters (in) box 16 where its value of acceleration is compared with a predetermined crash acceleration threshold value. Such a value may be, for example, 2 g, or two times the magnitude of the acceleration due to gravity. Similarly, the Ac signal is sent to box 18 for comparison with a predetermined crash acceleration value for the front-end location. This value may be 8–12 g, for example, depending upon the vehicle structure and accelerometer resolution. In the case of normal driving conditions the As value does not exceed 2 g and the Ac value does not exceed its threshold. So long as the enable signal, En, in box 16 remains "off" or the enable signal in box 18 remains "off", the crash analysis does not proceed with the three mode crash analysis of this invention.

If an As value exceeds its predetermined threshold as tested in box 16 an enable signal (En) is sent to Vs velocity/reset module 20 and the under-seat location clock is started with an initial value of to. When Vs module 20 receives its enabling signal (En), it commences calculation of time related, Vs values as will be described. But, as described above, the complete three mode analysis of this invention will not be started unless both enable boxes 16 and 18 issue enable commands within several milliseconds (e.g., 10–20 ms) of each other. Likewise, if an Ac value exceeds its predetermined threshold value as tested in box 18 an enable signal (En) is sent to front-end velocity and displacement calculation module 22. Enable box 18 also starts the front-end crash evaluation clock tor.

Thus, generally, the crash severity analysis of the FIG. 1 process is not executed. However, upon enabling signals being issued by both blocks 16 and 18, calculations proceed within modules 20 and 22 as follows.

Current values of As and Ac flow to modules 20 and 22, respectively. Values of As enter the under-seat velocity calculation block 24. Values of Vs are calculated, by adding (integrating) the values of As over time. Time values, to, are produced as signals (1) and corresponding values of Vs are continually calculated as signals (2) for up to 100 ms or so.

Time signals and Vs values are continually supplied to reset box 26. Incoming (in) Vs values are compared with immediate predecessors. The test is to see if the incoming values exceed a predetermined threshold, e.g., 0.5 mph, within a specified time window, for example 10 ms and if the rate of increase of Vs is less than that corresponding to an acceleration of about 1 g thereon. If not, a reset command is issued to all relevant process boxes and the process is restarted with the next cycle. A reset signal from box 26 is transmitted to enable boxes 16 and 18, Vs calculation box 24 and the respective calculation boxes (boxes 28, 32, 34, 36, 38, and 42, all to be described below) of module 22. In other words, in a reset situation the initial As value that enabled the process is later attributed to a non-crash related event.

As values of Vs are being produced in module 20, velocity and displacement calculations for the front-end sensor location are being conducted in module 22.

Front-end acceleration values, Ac, are integrated over time (box 28) to produce a series of front-end velocity values, Vc. Ac values are also processed, in box 30, to obtain their absolute values for a displacement calculation used in the practice of this invention. Corresponding front-end crash times, tor, are produced as signals (3).

Current values of Vc are output from box 28 and sent to a maximum velocity value box 32. Only current maximum values of Vc leave box 32 as, Vcm, signals (4). The values of Vcm are integrated, box 34, to produce continuous values of front-end displacement, Sc, signals (5) corresponding to respective time values, tor.

Absolute values of front-end acceleration, |Ac|, are integrated over time to produce values of front-end velocity, Vabs, box 36. Values of Vabs are output from box 36 and sent to a maximum velocity value, box 38. The current maximum value of Vabs leaves box 38 for use in subtraction box 40 and Scad displacement calculation box 42. These steps will be described in detail in the following paragraph. The current maximum velocity values in boxes 38 and 42 are also reset by a command from reset box 26.

In accordance with this invention, particular front-end displacement values, Scad, are used in analysis of certain crash modes. The values of Scad are continuously calculated using the following double integration equation.

$$Scad = \int (max(\int |Ac| \cdot dt) - Vcm) \cdot dt$$

The integration of |Ac| with time has been performed in block 36. The subtraction of Vcm from the maximum of Vabs is performed in subtraction block 40 and the continuous integration of the differences performed in block 42. Block 42 produces continuous values of Scad correlated with tor as signals (6).

Accordingly, the function of the sub-processing that is carried out in FIG. 2 is to determine whether a crash situation requiring air bag deployment may exist. This is determined by continually comparing As and Ac values with predetermined threshold acceleration values as described above. If the threshold values are exceeded, an enabling signal is issued causing the microprocessor to start the process of calculating the current values of velocity and displacement for the sensor locations. The enabling signal is represented by II in boxes 50, 52, 54, 56, 58 and 60 of FIG. 1. The respective process does not proceed in a box until it has been enabled by a previous determination.

Referring again to FIG. 1, it is shown that the outputs of the processing box 10, the summation of the processing in FIG. 2, comprises six current values: to, tor, Vs, Vcm, Sc and Scad. Over the next several millisecond intervals, the controller will continue to update these values as the potential crash situation develops. As they are determined the signals are used in the three crash mode analyses of this process. The appropriate time, velocity and displacement values are used for the first stage determinations of the frontal, angle and pole modes. These calculations are illustrated and indicated in boxes 50, 52 and 54 respectively. These determinations are conducted generally in parallel (to the extent permitted by controller operation) and the specific analyses for the respective stage 1 boxes will now be described in more detail.

Figure 3:
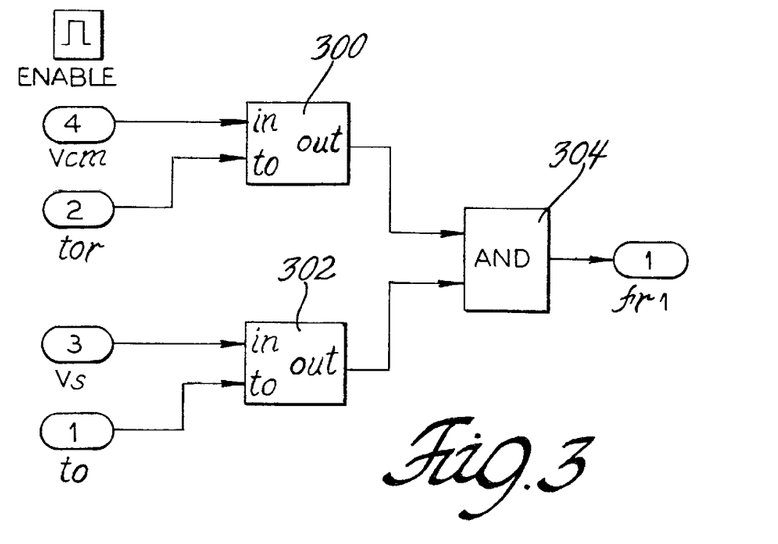
FIG. 3 is a process flow diagram for assessing first stage airbag deployment under the frontal vehicle crash mode.

FIG. 3 illustrates the analyses of the first stage of the frontal mode, the detailed logic of the process indicated in box 50 of FIG. 1. The first stage of the frontal crash mode is characterized by high values of Vs and Vcm. The EFS velocity value, Vcm, together with its current time count, tor, are forwarded to comparison box 300. SDM velocity, Vs, and its time count, to, are forwarded to comparison box 302. In comparison box 300, the value of Vcm is compared with a predetermined threshold velocity and, depending upon whether Vcm is greater than the threshold velocity, an output of 1 for yes or 0 for no is forwarded to AND box 304. Similarly, in comparison box 302 a comparison is made between Vs and a suitable threshold velocity for the underseat sensor. A value of 0 for no or 1 for yes is forwarded from comparison box 302 to AND box 304.

The threshold values for Vs and Vcm are determined either by crash testing or by computer modeling to provide values that are reflective of a full frontal barrier collision under varying vehicle velocities. For example, with respect to a particular vehicle, suitable values of velocity thresholds are determined based on the velocity values at the required deployment time calculated from the beginning of a crash enabling event for a period up to 100 ms or so.

Figure 9A:
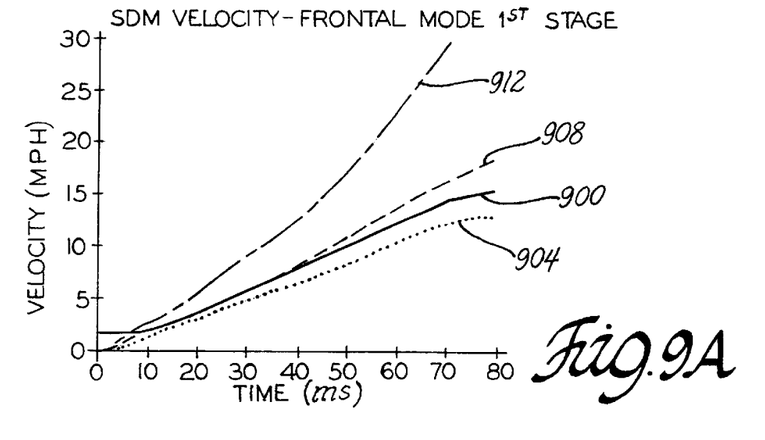
FIGS. 9A–9C are graphs presenting illustrative threshold values of time based velocity data in miles per hour, mph, for frontal mode, first stage and second stage inflation, crash analyses. The data is presented for SDM and EFS sensor locations. The graphs also include velocity data at the sensor locations obtained from representative frontal mode crash events of a vehicle.

Solid line curve 900 in FIG. 9A plots threshold velocities for the SDM sensor location for values of to up to 80 ms for a representative vehicle. As shown in this example, the threshold values are fairly constant at about 2 miles per hour from the onset of the crash to a required sensing time of about six to eight milliseconds after the enabling signal for a very severe crash event. The curve 900 threshold values increase generally linearly to about 15 miles per hour over the next 60 ms.

Figure 9B:
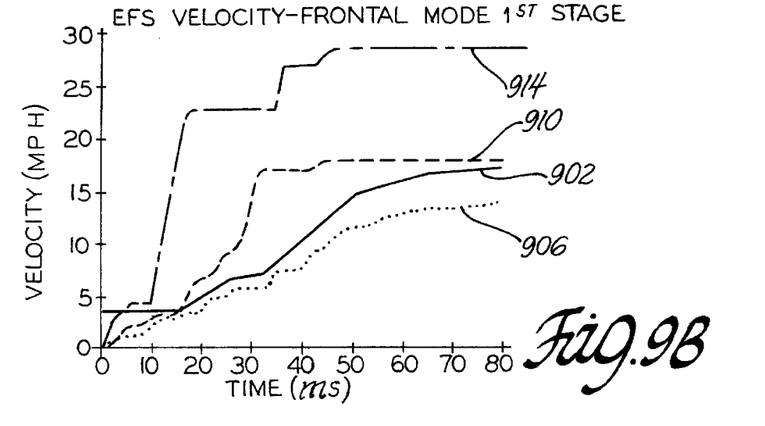

Solid line curve 902 in FIG. 9B shows the higher threshold velocity values for the front end, EFS, sensor location. The central frontal sensor is in the crush zone of the vehicle during a frontal full barrier crash. The EFS location threshold velocity is set at about 3–4 miles per hour up to about 16 ms of elapsed time, tor, and increases thereafter to about 17.5 mph at 80 milliseconds. Depending on the perceived severity of a crash, the required time for a deployment decision may vary from a few milliseconds to many milliseconds and, thus, threshold velocity and displacement values are predetermined for up to about 80 to 100 milliseconds. In general, the threshold values continue to increase over this period.

Box 304 of FIG. 3 is an AND box which means that this first stage frontal mode analysis will issue a "deploy" command only if it receives a yes (or 1) signal from each of the velocity comparisons. Thus a crash mode is characterized by a certain pattern of all the velocities and/or displacements at all sensor locations. The output "yes" or "no" is forwarded to the second stage-frontal mode comparison box 56, FIG. 1, and to the stage 1 deployment box 62. If the output from box 50 is yes, (signal fr1), and if it is the first crash mode comparison box to issue a "yes" command, such signal will prompt a "deploy" command from stage 1 deployment box and air bag inflation will be initiated. A timely "yes" (signal fr1) output from box 50 will also initiate a second stage frontal mode evaluation to be started in box 56. And box 62 will issue a command stopping further crash evaluations in first stage angle mode and pole mode comparison boxes 52 and 54.

FIGS. 9A and 9B also show actual SDM and EFS sensor location velocity data for three frontal crashes of increasing severity. Dotted line curves 904 (SDM location) and 906 (EFS location) are velocity curves over time from onset of crash analysis enablement (i.e., to and tor) for a 12 mph frontal impact. It is seen that neither curve 904 nor curve 906 exceeds its corresponding threshold velocity, curve 900 or 902. Accordingly, by the frontal mode crash analysis of FIG. 3, this impact does not result in first stage inflation of the vehicle airbag. However, FIGS. 9A and 9B presents SDM and EFS velocity data from frontal impacts that do cause air bag inflation.

Dashed line curves 908 and 910 are velocity data from an 18 mph frontal impact. It is seen that both curves 908 and 910 exceed their respective threshold velocity curves 900 and 902. Accordingly, by the frontal mode crash analysis of FIG. 3, this impact does result in first stage inflation of the air bag. The dot-dash velocity curves are data from a 30 mph frontal impact that would require first stage air bag inflation. Similar to dashed line curves 908 and 910, dot-dash line velocity curves 912 and 914 both exceed the corresponding threshold velocity curves 900 and 902.

Thus, first stage deployment box 62 (FIG. 1) is an OR box and the first deployment command to reach it from any of the crash mode comparison boxes 50, 52 or 54 will prompt first stage air bag inflation, signal fire st1. As soon as a first stage deployment decision is reached in one of the three crash modes, such decision comparisons are terminated in the other two modes. Second stage deployment comparisons are continued only in the crash mode that first issues a first stage deployment command.

In the event that the first cycle of first stage frontal mode comparisons result in a "no," and the other first stage crash mode results are "no," new velocity and displacement values are input to boxes 50, 52 and 54. The controller continues to cycle through these crash mode determinations until a "yes" is produced or until enough cycles elapse and it is concluded that the event that started this processing does not require air bag deployment.

The first stage-frontal mode analysis has been completed above. The angle mode and pole mode, first stage analyses will now be described. It is worthwhile to note that the angle mode includes not only the regular angle crash impacts but also the offset deformable barrier crash impacts since they have a similar behavior for the vehicle exemplified.

Figure 5:
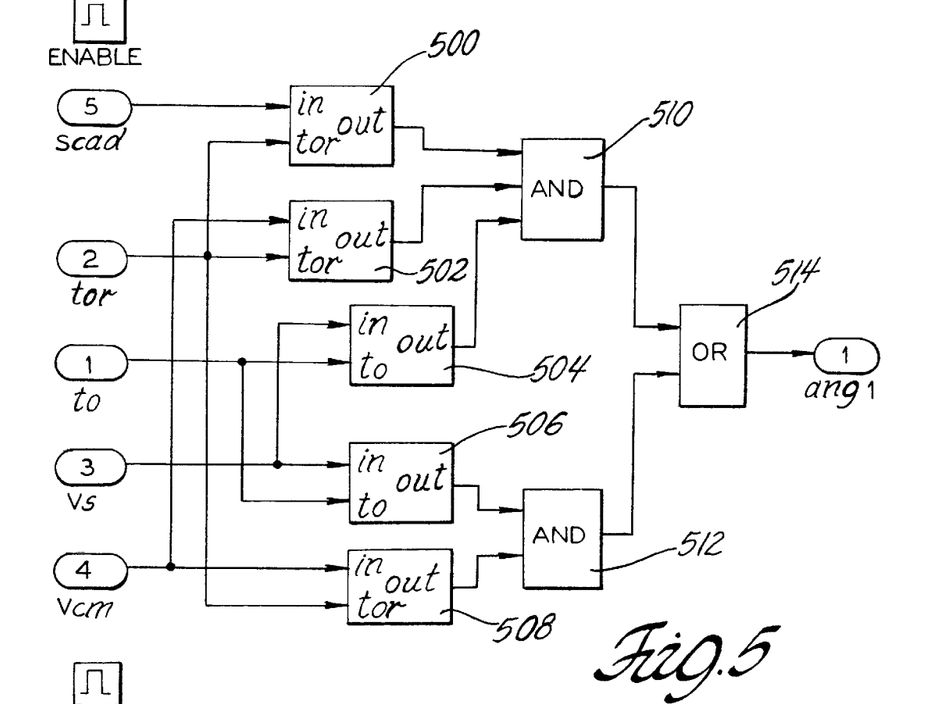
FIG. 5 is a process flow diagram for assessing first stage airbag deployment under the angle vehicle crash mode.

The angle mode, first stage, analysis is illustrated in FIG. 5. This is a detailed description of the analysis performed in box 52 of FIG. 1. In this first stage analysis air bag inflation is predicated on either a combination of suitably high Vs and Vcm values for high speed severe impact events, or a suitable combination of Scad, Vs and Vcm values for lower speed impact events. Accordingly, these values together with the respective time counts, to and tor, are used in the FIG. 5 angle mode, first stage comparison. This angle mode, first stage comparison thus involves two parts.

Figure 10A:
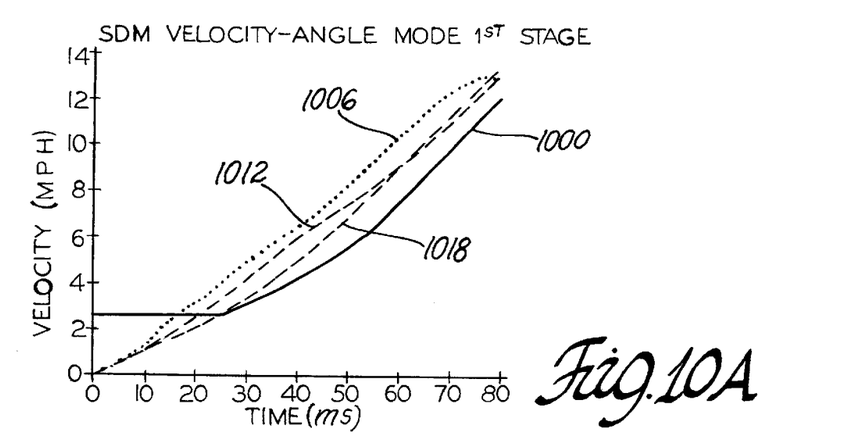
FIGS. 10A–10C are graphs presenting illustrative threshold values of time based velocity data, mph, and displacement data in centimeters, cm, for angle mode, first stage inflation, crash analyses. The data is presented for SDM and EFS sensor locations. The graphs also include velocity and displacement data at sensor locations obtained from low impact speed representative crash events considered in an illustration of angle mode, first stage inflation analyses.
Figure 10B:
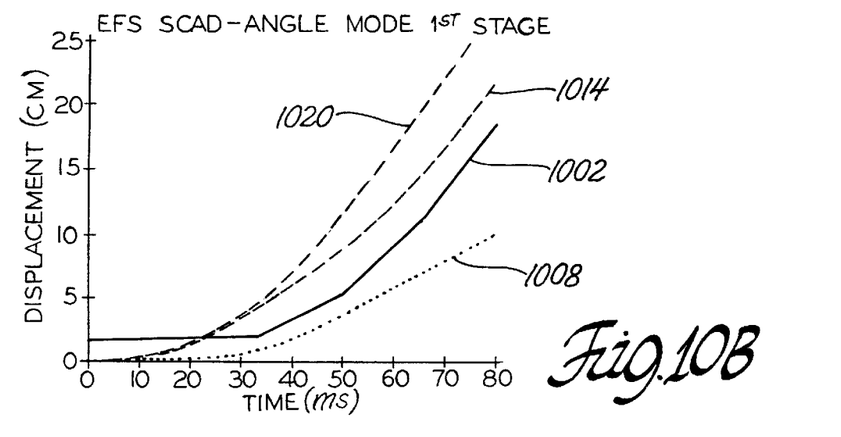
Figure 10C:
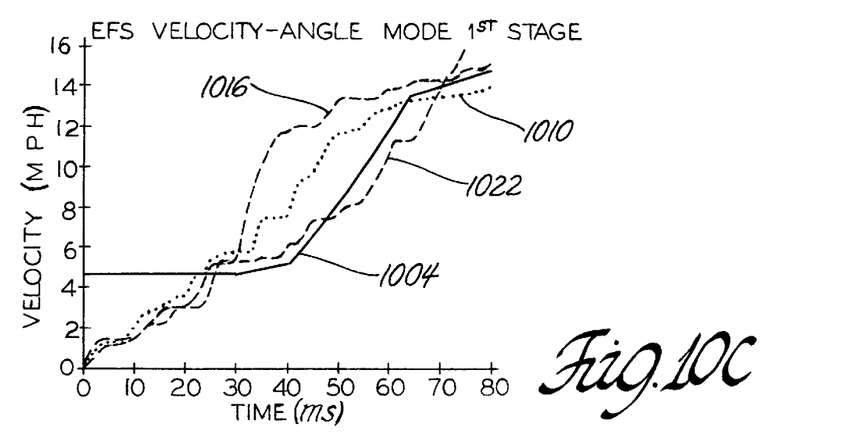

In a first part of this angle mode analysis, comparison box 500 receives current values of Scad and tor. Comparison box 502 receives current values of Vcm and tor and comparison box 504 receives current Vs and to signals. The respective threshold values for Scad, Vcm and Vs in boxes 500, 502 and 504 are set for relatively low speed angle-like events. FIGS. 10A–10C provide threshold values for an exemplary vehicle as well as actual velocity and displacement data for the sensor locations from representative low impact speed angle-like events. Solid line curve 1000 in FIG. 10A plots threshold velocity with crash time (to) for the SDM sensor location for use in comparison box 504. Solid line curve 1002 in FIG. 10B plots threshold displacement values (Scad) with crash time (tor) for the SDM sensor location for use in comparison box 500. Solid line curve 1004 in FIG. 10C plots threshold velocity with crash time (tor) for the SDM sensor location for use in comparison box 502.

The outputs of comparison boxes 500, 502, and 504 go to AND box 510. If current values of Scad, Vs and Vcm all exceed their respective thresholds, a "yes" signal is sent to OR box 514. Otherwise a "no" signal is received in OR box 514 from AND box 510.

FIGS. 10A–10C also contain velocity and displacement data from actual low impact speed angle-like crash events. Dotted line curves 1006 (FIG. 10A), 1008 (FIG. 10B) and 1010 (FIG. 10C) are SDM velocity data, EFS Scad displacement data and EFS velocity data, respectively, for a 12 mph frontal crash. The purpose of showing the frontal crash data in the angle mode threshold graphs is to show that this angle mode analysis will not trigger a first stage airbag deployment form such a frontal event. Dashed line curves 1012 (FIG. 10A), 1014 (FIG. 10B), and 1016 (FIG. 10C) are SDM velocity data, EFS Scad displacement data and EFS velocity data, respectively, for a 20 mph left angle crash. Since each of these data curves exceeds it corresponding threshold curve, this angle event will prompt a "yes" in Box 510 and Box 514 and initiate a first stage deployment. Dashed line curves 1018 (FIG. 10A), 1020 (FIG. 10B), and 1022 (FIG. 10C) are SDM velocity data, EFS Scad displacement data and EFS velocity data, respectively, for a 25 mph left side ODB crash. Since each of these data curves exceeds its corresponding threshold curve for the time interval significant to deployment decision, this angle-like event will prompt a "yes" in Box 510 and Box 514 and initiate a first stage deployment.

Figure 11A:
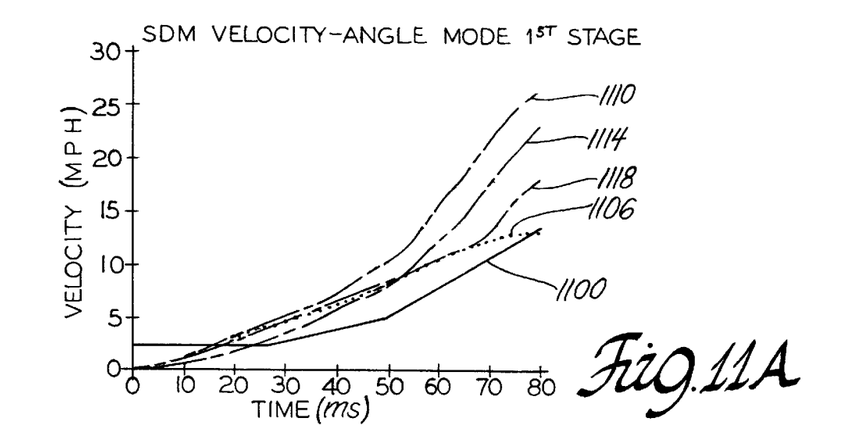
FIGS. 11A–11C are graphs presenting illustrative threshold values of time based velocity data, mph, and displacement data, cm, for angle mode, first stage and second stage inflation, crash analyses. The data is presented for SDM and EFS sensor locations. The graphs also include velocity and displacement data at sensor locations obtained from representative high impact speed crash events considered in illustrations of angle mode first and second stage inflation analyses.

The second portion of the angle mode analysis proceeds concurrently with the first portion. Current values of Vs and to are received in comparison box 506 and current values of Vcm and tor are received in comparison box 508. As stated, this portion of the analysis is looking for higher speed impacts. Solid line curve 1100 in FIG. 11A plots threshold velocity with crash time (to) for the SDM sensor location for use in comparison box 506. Solid line curve 1102 in FIG. 11B plots threshold velocity with crash time (tor) for the EFS sensor location for use in comparison box 508.

Comparison values from 506 and 508 go to AND box 512. If current values of Vs and Vcm both exceed their thresholds, a "yes" value is forwarded to OR box 514, otherwise a "no" is sent.

Figure 11B:
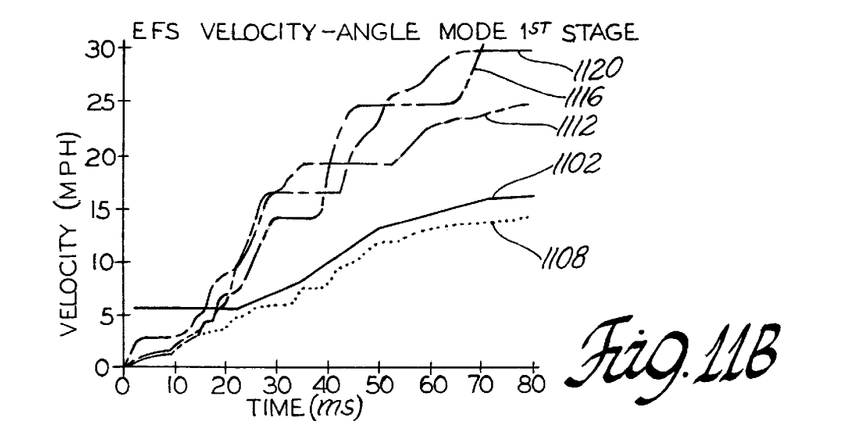

FIGS. 11A and 11B also contain velocity data from actual high impact speed angle-like crash events. Dotted line curves 1106 (FIG. 11A) and 1108 (FIG. 11B) are SDM velocity data and EFS velocity data, respectively, for a 12 mph frontal crash. The purpose of showing the frontal crash data in the angle mode threshold graphs is to show that this angle mode analysis will not trigger a first stage airbag deployment from such a frontal event. Dot-dash line curves 1110 (FIG. 11A) and 1112 (FIG. 11B) are SDM velocity data and EFS velocity data, respectively, for a 30 mph left side angle crash. Since each of these data curves exceeds its corresponding threshold curve, this angle event will prompt a "yes" in AND Box 512 and OR Box 514 and initiate a first stage deployment. Dot-dash line curves 1114 (FIG. 11A) and 1116 (FIG. 11B) are SDM velocity data and EFS velocity data, respectively, for a 30 mph right side angle crash. Since each of these data curves exceeds its corresponding threshold curve, this angle event will prompt a "yes" in AND Box 512 and OR Box 514 and initiate a first stage deployment. Dot-dash line curves 1118 (FIG. 11A) and 1120 (FIG. 11B) are SDM velocity data and EFS velocity data, respectively, for a 40 mph left side ODB crash. Since each of these data curves exceeds it corresponding threshold curve, this angle-like event will prompt a "yes" in AND Box 512 and OR Box 514 and initiate a first stage deployment.

OR box 514 must receive a "yes" or 1 value from either AND box, 510 or AND box 512, to issue a 1 to angle mode, first stage output, ang (1). The ang (1) signal is forwarded as input in2 to OR box 62, FIG. 1, which is the first stage deployment decision box. As stated above, the first positive deployment command to reach box 62 initiates first stage air bag deployment, fire st1. Otherwise, comparison processing continues in each of the first stage crash mode analyses.

Figure 7:
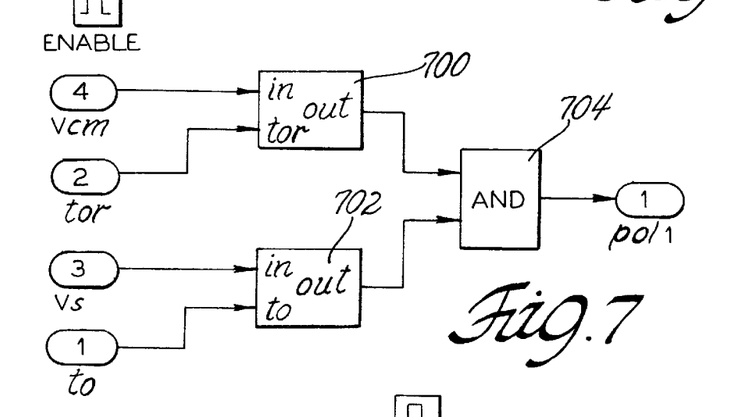
FIG. 7 is a process flow diagram for assessing first stage airbag deployment under the pole vehicle crash mode.
Figure 12A:
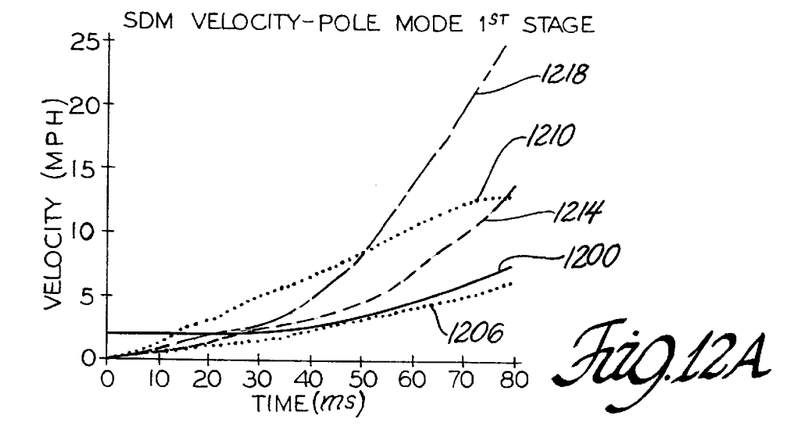
FIGS. 12A–12C are graphs presenting illustrative threshold values of time based velocity data, mph, and displacement data, cm, for pole mode, first stage and second stage inflation, crash analyses. The data is presented for SDM and EFS sensor locations. The graphs also include velocity and displacement data at the sensor locations obtained from representative crash events considered in illustrations of pole mode first and second stage inflation analyses.

FIG. 7 illustrates the comparison analysis for pole mode, first stage as executed in box 54 of FIG. 1. In pole mode, first stage, the under-seat and front-end velocity values are compared with suitable threshold values. Current values of Vcm and tor are sent to comparison box 700 and current values of Vs and to are sent to comparison box 702. Solid line curve 1200 in FIG. 12A plots threshold velocity with crash time (to) for the SDM sensor location in an illustrative vehicle for use in comparison box 702. Solid line curve 1202 in FIG. 12B plots threshold velocity with crash time (tor) for the EFS sensor location for use in comparison box 700.

The comparison results from boxes 700 and 702 go to AND box 704. If the current values of Vcm and Vs both exceed their respective thresholds in this pole mode analysis, AND box 704 generates a "yes " signal for pol 1. Otherwise, the comparison analysis proceeds until one of the mode analyses generates an airbag deployment signal or time for the evaluation lapses. Thus, the requirement of the pole mode, first stage is that both Vcm and Vs exceed their respective threshold values before AND box 704 transmits a deploy signal to poll and to air bag deployment decision box 62 in FIG. 1.

Figure 12B:
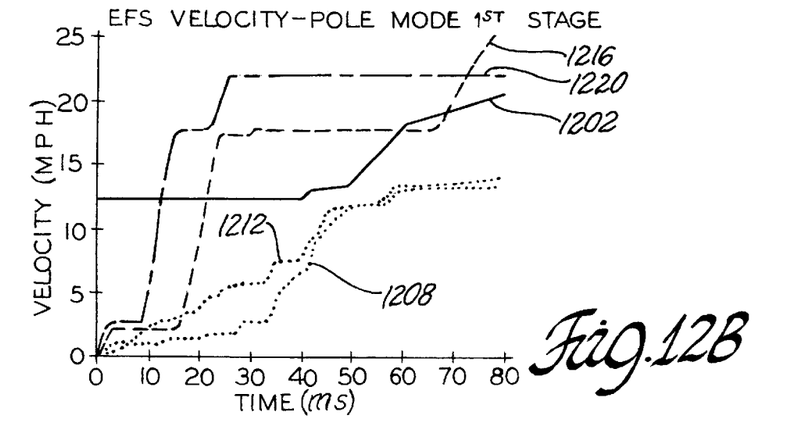

FIGS. 12A and 12B also contain SDM and EFS velocity data from actual crash events to further illustrate the pole mode, first stage analysis. Dotted line plots 1206 (FIG. 12A) and 1208 (FIG. 12B) show velocities over periods of 80 ms from crash determination for the SDM sensor location and the EFS sensor location resulting from a 12 mph pole crash. The velocities at the sensor locations from these crashes do not exceed the corresponding threshold velocities and no airbag inflation will result. Dotted line plots 1210 (FIG. 12A) and 1212 (FIG. 12B) show velocities over periods of 80 ms from crash determination for the SDM sensor location and the EFS sensor location resulting from a 12 mph frontal impact. The velocities at the EFS sensor location do not exceed the corresponding threshold velocity and no airbag inflation will result.

Dashed line curves 1214 (FIG. 12A) and 1216 (FIG. 12B) show velocities over periods of 80 ms from crash onset for the SDM sensor location and the EFS sensor location resulting from a 20 mph pole crash. Both velocity curves exceed their corresponding threshold velocity curves within 30 ms of crash onset and a first stage deployment would be commanded from the box 54 and FIG. 7 modal analysis. Dot-dash line curves 1218 (FIG. 12A) and 1220 (FIG. 12B) show velocities over periods of 80 ms from crash onset for the SDM sensor location and the EFS sensor location resulting from a 30 mph pole crash. Both velocity curves soon exceed their corresponding threshold velocity curves and a first stage deployment would be commanded from the box 54 and FIG. 7 modal analysis.

Figure 4:
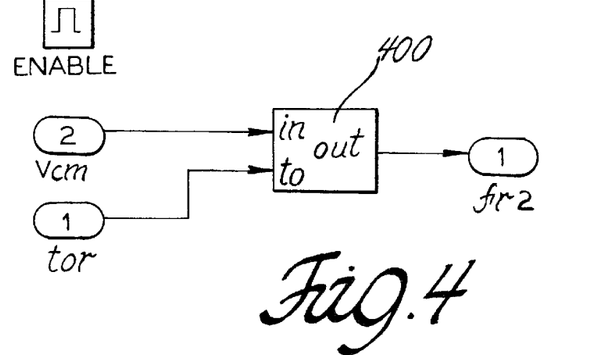
FIG. 4 is a process flow diagram for assessing second stage airbag deployment under the frontal crash mode.

The frontal mode, second stage deployment analysis executed in box 56 of FIG. 1 is shown in FIG. 4. This analysis is based solely on the velocity at the EFS sensor and current values of Vcm and tor enter comparison box 400. These incoming velocity values are compared with the threshold velocity values plotted in solid line curve 916 of FIG. 9C. Frontal mode, second stage processing continues until a positive comparison signal in box 400 is obtained, or time elapses. A positive frontal mode, second stage signal, fr 2, is sent to the second stage deployment decision box 64, FIG. 1.

Figure 9C:
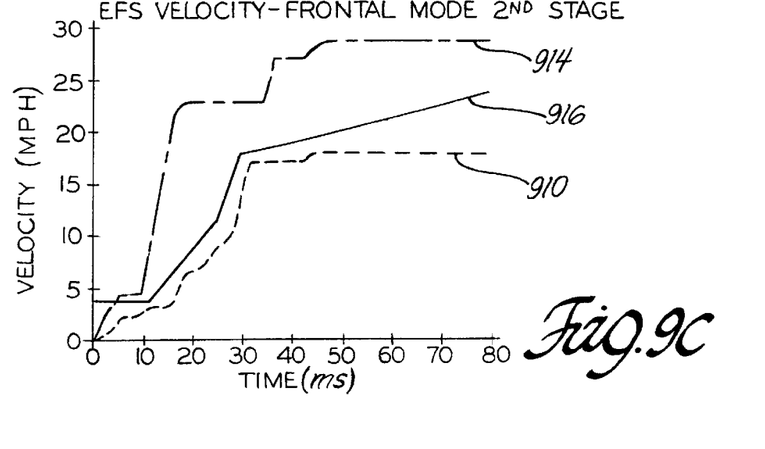

FIG. 9C also contains EFS velocity data for the 18 mph frontal impact, curve 910, and the 30 mph frontal impact, curve 914. It is seen that the 18 mph impact does not result in a second stage deployment because curve 910 doesn't cross threshold curve 916 during the analysis. However, the 30 mph impact does result in second stage deployment. EFS velocity in this impact, curve 914 exceeds the threshold within about 5 ms of crash detection and process enablement.

Figure 6:
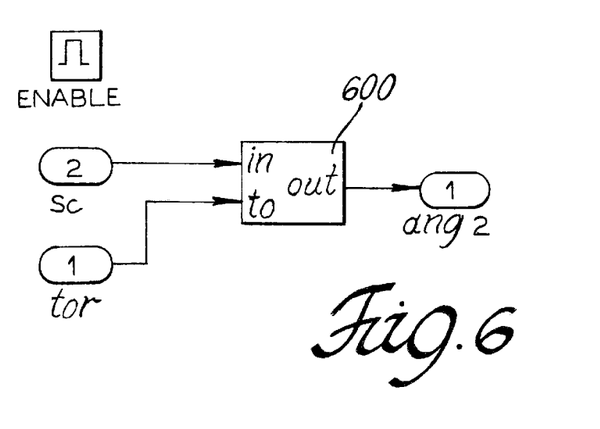
FIG. 6 is a process flow diagram for assessing second stage airbag deployment under the angle vehicle crash mode.

The angle mode, second stage comparison as executed in box 58 of FIG. 1 is illustrated in FIG. 6. Current values of EFS displacement, Sc, and tor enter comparison box 600. Threshold values for EFS displacement are presented as solid line 1104 in FIG. 11C. If a timely value of Sc exceeds its corresponding threshold in curve 1104, a signal from box 600 will command a deployment signal ang 2. This second stage deployment signal will be transmitted to the second stage deployment decision box 64 of FIG. 1.

Figure 11C:
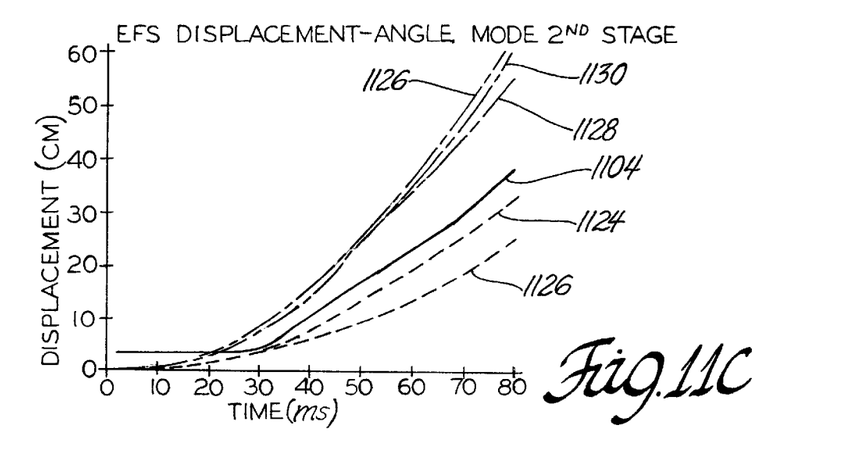

FIG. 11C also contains displacement data at the EFS sensor location for several angle like impacts. Dashed line curves 1122 and 1124 are EFS displacement data for a 25 mph left side ODB impact and a 20 mph left side angle impact, respectively. It is seen that neither impact will result in second stage inflation by the box 58 and FIG. 6 analysis. Each of dot-dash line curves 1126, 1128 and 1130 exceed threshold displacement curve 1104 and will result in second stage inflation. Curve 1126 is displacement/time data for a 30 mph right side angle impact; curve 1128 displacement/time data for a 30 mph left side angle impact and curve 1130 displacement/time data for a 40 mph left side ODB impact.

Figure 8:
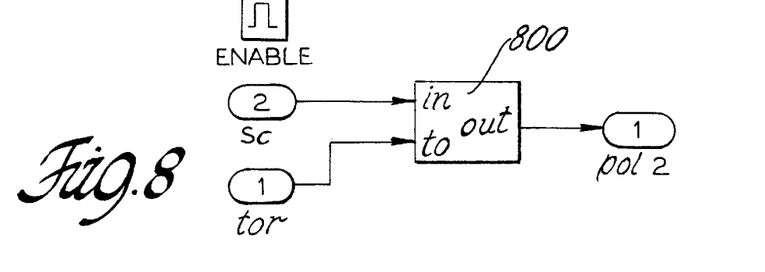
FIG. 8 is a process flow diagram for assessing second stage airbag deployment under the pole vehicle crash mode.

The pole mode, second stage analysis as executed in box 60 of FIG. 1 is shown in FIG. 8. Current values of Sc are also used in this analysis with appropriate threshold values. Values of Sc and tor are sent to comparison box 800. Threshold displacement values for the EFS location over a crash period of 80 ms are presented in solid line curve 1204 (FIG. 12C) for use in this pole mode, second stage analysis. If and when a current Sc value exceeds its threshold, a positive signal, pol 2, is transmitted to second stage deployment decision box 64 in FIG. 1.

Figure 12C:
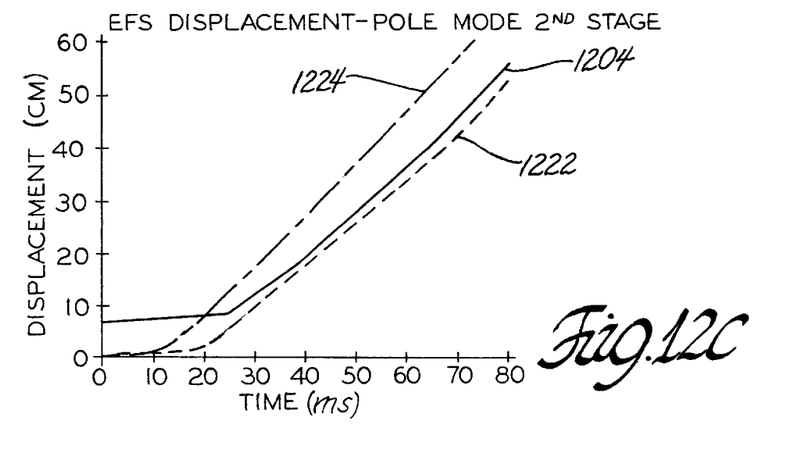

FIG. 12C also contains EFS location displacement data for a 20 mph pole impact, dashed curve 1222, and for a 30 mph pole impact, dot-dash curve 1224. The 20 mph pole impact, curve 1222, does not cross threshold curve 1204 within 80 ms and does not result in second stage inflation by the box 60 and FIG. 8 analysis. The 30 mph pole impact, curve 1224, does exceed the threshold displacement curve and initiates second stage inflation.

The second stage deployment decision box 64 in FIG. 1 acts like an OR box. It receives signals from any of the second stage comparison boxes 56, 58 or 60. But in any crash event, box 64 receives signals from only the activated second stage box from among boxes 56, 58 and 60.

Thus, this invention provides a crash severity determination method that identifies distinct front end vehicle crash modes and associates with these modes crush velocity and displacement data from two vehicle body acceleration sensor locations. The crash detection controller continually compares acceleration data from the two sensors with predetermined threshold values indicative of a crash possibility. The controller then determines current values of crush velocity and displacement at the sensor location at the front of the vehicle and of crush velocity at the center of the vehicle body and in the passenger compartment. Suitable selections are made from these values to assess, in parallel, each of at least three front-end crash modes before activating an air bag or other safety device.

The crash modes selected are based on the crash experience of the vehicle. Only values of crush velocity and displacement are used and the threshold velocity and displacement values used in the analysis of the respective crash modes may be based on crash tests and/or crash modeling. The analysis employed in the respective mode uses velocity and or displacement values at the sensor location(s) most responsive to significant crushing in the particular impact mode under analysis. This practice is executed on a suitable microprocessor and is readily adapted to managing two or more levels of device activation in the available time periods after the onset of a crash.

The invention has been described in terms of a preferred embodiment. However, it is apparent that other forms could readily be adapted by one skilled in the art.

What is claimed is:

1. A method of activating a safety device for vehicular passenger protection in the passenger compartment of a vehicle having a forward direction of travel in which it is susceptible to a frontal crash, said vehicle having a centrally located acceleration sensor forward of said compartment producing acceleration signals (Ac), an acceleration sensor in said passenger compartment producing acceleration signals (As), and a computer for continually processing acceleration signals from said sensors during vehicle operation to detect a frontal crash and, thereafter, further processing said acceleration signals, said method comprising;

pre-identifying at least two different modes of frontal crashes that produce different patterns of velocity/time values and displacement/time values for each of said acceleration sensors as they experience a frontal crash in such modes of crash;

pre-determining safety device activation threshold velocity/time values and threshold displacement/time values, said time values commencing with the detection of a said crash for each of said sensors in each of said pre-identified modes, and by using said computer upon the detection of a frontal crash;

integrating each of said acceleration signals, Ac and As, over time to determine a current sequence of velocity values, Vc and Vs, for each of said sensor locations, and continually obtaining a maximum value of Vc as Vcm;

integrating said Vs and Vcm velocity values over time to determine current displacement values, Ss and Sc, for said sensor locations;

calculating a displacement value, Scad, for said centrally located sensor based on absolute values of Ac in accordance with the following equation: $Scad = \int (\max(\int |Ac| \cdot dt) - Vcm) \cdot dt$;

comparing selected of said Vs and Vcm velocity values and Ss, Sc and Scad displacement values with said predetermined corresponding velocity and displacement threshold values as a basis for determining whether any of said frontal crash modes requires safety device activation and; if any one of said mode comparisons requires activation, activating said device.

2. A method as recited in claim 1 in which said device is an inflatable air bag and said air bag is inflated by said activating step.

3. A method as recited in claim 1 in which said device is an air bag adapted to be inflated to a first stage of inflation and further to a second stage of inflation, and said air bag is inflated only to said first stage following the steps of claim 1.

4. A method as recited in claim 1 comprising pre-determining safety device activation threshold velocity/time values and threshold displacement/time values for a first stage activation of said safety device and a second stage activation of said safety device, said time values commencing with the detection of a said collision for each of said sensors in each of said pre-identified modes and by using said computer upon the detection of a frontal crash;

comparing selected of said Vs and Vcm velocity values and Ss, Sc and Scad displacement values with said predetermined corresponding velocity and displacement threshold values for said first stage as a basis for determining whether any of said frontal crash modes requires safety device activation and; if any one of said mode comparisons requires activation, activating said device to said first stage of activation.

5. A method as recited in claim 4 comprising, following activation of said device to said first stage resulting from one said mode comparison;

comparing selected of said velocity and displacement values with predetermined corresponding threshold velocity and displacement values for said second stage of said mode as a basis for determining whether said mode comparison requires second stage activation and, if said mode comparison so requires, activating said device to its second stage of activation.

6. A method of activating a safety device for vehicular passenger protection in the passenger compartment of a vehicle having a forward direction of travel in which it is susceptible to crash situations in a full frontal direction mode, a pole-like frontal mode and in an angular direction mode, said vehicle having a centrally located acceleration sensor forward of said compartment producing acceleration signals (Ac), an acceleration sensor in said passenger compartment producing acceleration signals (As), and a computer for continually processing acceleration signals from said sensors during vehicle operation, said method being executed on said computer during a crash situation and comprising integrating each of said acceleration signals, Ac and As, over time to determine a current sequence of velocity values, Vc and Vs, for each of said sensor locations, and continually obtaining a maximum value of Vc as Vcm;

integrating said Vcm velocity values over time to determine current displacement values, Sc, for said central sensor location;

calculating a displacement value, Scad, for said centrally located sensor based on absolute values of Ac in accordance with the following equation: $Scad = \int (\max(\int |Ac| \cdot dt) - Vcm) \cdot dt$;

comparing said Vs and Vcm velocity values with predetermined threshold velocity values for said sensor locations as a basis for determining whether a full frontal mode crash situation requires safety device actuation;

comparing selected of said Vs and Vcm velocity values and Sc and Scad displacement values with predetermined corresponding velocity and displacement threshold values as a basis for determining whether an angular mode or pole-like frontal crash situation requires safety device activation and; if any one of said frontal or angular crash mode comparisons requires activation, activating said device.

7. A method as recited in claim 6 in which said device is an inflatable air bag and said air bag is inflated by said activating step.

8. A method as recited in claim 6 in which said device is an air bag adapted to be inflated to a first stage of inflation and further to a second stage of further inflation, and said air bag is inflated only to said first stage following the steps of claim 6.

9. A method as recited in claim 6 comprising comparing selected of said velocity and displacement values with predetermined corresponding higher velocity and displacement values as a basis for determining whether any of said full frontal, pole-like frontal or angular mode crash situation requires further safety device activation and, if any one of crash mode comparisons requires further activation, activating said device to its second stage of activation.

10. A method as recited in claim 6 in which said device has been activated to a first stage of activation by a full frontal mode crash situation, said method further comprising comparing a current sequence of said Vcm values with second stage threshold Vcm values, and activating said device to a second stage of activation providing a said Vcm value exceeds its second stage threshold velocity.

11. A method as recited in claim 7 in which said device has been activated to a first stage of activation by a full frontal mode crash situation, said method further comprising comparing a current sequence of said Vcm values with second stage threshold Vcm values, and activating said device to a second stage of activation providing a said Vcm value exceeds its second stage threshold velocity.

12. A method as recited in claim 8 in which said device has been activated to a first stage of activation by a full frontal mode crash situation, said method further comprising comparing a current sequence of said Vcm values with second stage threshold Vcm values, and activating said device to a second stage of activation providing a said Vcm value exceeds its second stage threshold velocity.

13. A method as recited in claim 6 in which said Scad displacement values are compared with first stage threshold Scad values and said Vs and Vcm velocity values are compared with first stage threshold velocity values in an angle mode crash situation, and activating said device to a first stage of activation providing (a) said Scad, Vcm and Vs values each exceed a first set of first stage threshold values or (b) said Vcm and Vs values each exceed a second set of first stage threshold velocity values.

14. A method as recited in claim 7 in which said Scad displacement values are compared with first stage threshold Scad values and said Vs and Vcm velocity values are compared with first stage threshold velocity values in an angle mode crash situation, and activating said device to a first stage of activation providing (a) said Scad, Vcm and Vs values each exceed a first set of first stage threshold values or (b) said Vcm and Vs values each exceed a second set of first stage threshold velocity values.

15. A method as recited in claim 8 in which said Scad displacement values are compared with first stage threshold Scad values and said Vs and Vcm velocity values are compared with first stage threshold velocity values in an angle mode crash situation, and activating said device to a first stage of activation providing (a) said Scad, Vcm and Vs values each exceed a first set of first stage threshold values or (b) said Vcm and Vs values each exceed a second set of first stage threshold velocity values.

16. A method as recited in claim 13 in which said device has been activated to a first stage of activation by an angle mode crash situation, said method further comprising comparing said Sc values with second stage threshold Sc values, and activating said device to a second stage of activation providing a Sc value exceeds its second stage threshold value.

17. A method as recited in claim 6 in which Vcm and Vs velocity values are compared with corresponding first stage threshold velocity values in a pole-like frontal crash mode, and activating said device to a first stage providing said velocity values each exceed their corresponding first stage threshold velocities.

18. A method as recited in claim 7 in which Vcm and Vs velocity values are compared with corresponding first stage threshold velocity values in a pole-like frontal crash mode, and activating said device to a first stage providing said velocity values each exceed their corresponding first stage threshold velocities.

19. A method as recited in claim 8 in which Vcm and Vs velocity values are compared with corresponding first stage threshold velocity values in a pole-like frontal crash mode, and activating said device to a first stage providing said velocity values each exceed their corresponding first stage threshold velocities.

20. A method as recited in claim 17 in which said device has been activated to a first stage of activation by an pole-like mode crash situation, said method further comprising comparing Sc displacement values with second stage threshold Sc values, and activating said device to a second stage of activation providing said displacement value exceeds its threshold value.

* * * * *